April 30, 1968 A. K. McELWRATH ET AL 3,380,559

FRICTION DEVICE

Filed Dec. 23, 1963 7 Sheets-Sheet 1

INVENTORS:
ALLEN K. McELWRATH
HOWARD W. FIELD
BY: Joseph E. Rajen

April 30, 1968 A. K. McELWRATH ET AL 3,380,559

FRICTION DEVICE

Filed Dec. 23, 1963 7 Sheets-Sheet 2

INVENTORS:
ALLEN K. McELWRATH
HOWARD W. FIELD
BY:
Joseph E. Papa

FRICTION DEVICE

Filed Dec. 23, 1963

INVENTORS:
ALLEN K. McELWRATH
HOWARD W. FIELD
BY: Joseph E. Papin

FRICTION DEVICE

Filed Dec. 23, 1963

INVENTORS:
ALLEN K. McELWRATH
HOWARD W. FIELD
BY:
Joseph E. Papin.

FRICTION DEVICE

Filed Dec. 23, 1963

INVENTORS:
ALLEN K. McELWRATH
HOWARD W. FIELD
BY: Joseph E. Papin

INVENTORS:
ALLEN K. Mc ELWRATH
HOWARD W. FIELD
BY:
Joseph E. Papin

INVENTORS:
ALLEN K. McELWRATH
HOWARD W. FIELD
BY: Joseph E. Papin.

United States Patent Office 3,380,559
Patented Apr. 30, 1968

3,380,559
FRICTION DEVICE
Allen K. McElwrath, Florissant, and Howard W. Field, Ferguson, Mo., assignors, by mesne assignments, to Wagner Electric Corporation, Newark, N.J., a corporation of Delaware
Filed Dec. 23, 1963, Ser. No. 332,390
8 Claims. (Cl. 188—78)

Figures 1, 4:
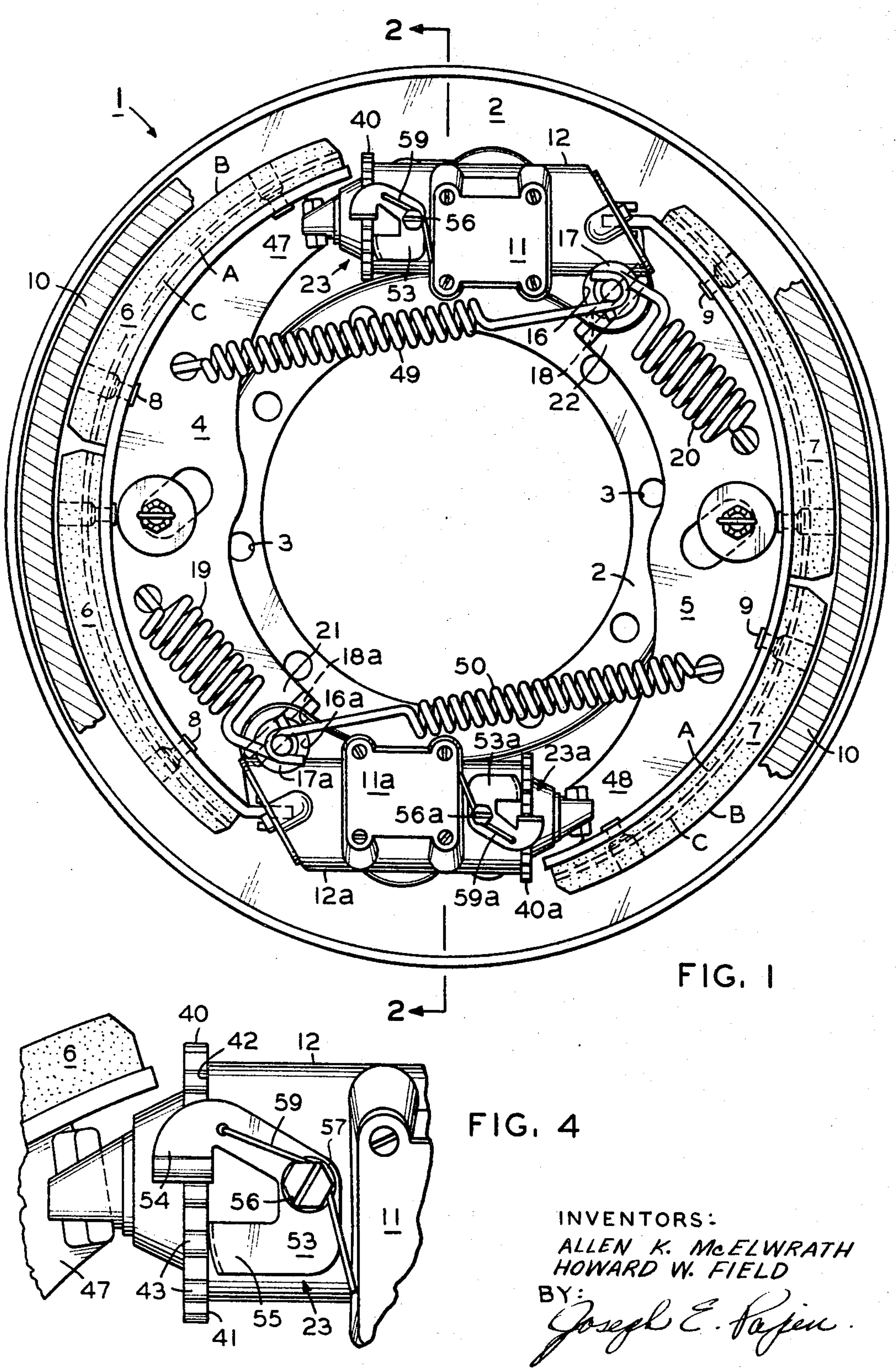

This invention relates to friction devices and in particular to a wedge actuated friction device and actuating means and adjusting mechanism therefor operable to control displacement of a friction member of said friction device.

In past friction devices, adjusting mechanisms therefor were automatically and/or manually operable to adjustably reposition the retracted position of a friction member of said friction device with respect to a cooperating friction drum. Such adjustable repositioning of the friction member retracted position was necessary in order to maintain the relative displacement between said friction member and drum substantially constant irrespective of the wear of friction material or linings on said friction member occasioned by frictional engagement with said friction drum. The friction linings were secured on the friction member by removable securing means, such as rivets or the like, or by a bonding process, and of course, due to lining wear occasioned by frictional engagement, the friction surface of the lining eventually became substantially coplanar with the securing means or with the friction member itself. An undesirable feature of the past friction device adjusting mechanisms was that the retracted position of the friction member having severely worn lining, as above described, could be adjustably repositioned so that normal and/or adjustable displacement of said friction member and lining toward frictional engagement engaged the rivets or the friction element itself with said drum resulting in drum scoring or other irreparable damage to said drum and/or said friction member and friction device. In the past wedge actuated friction devices, a cage and roller assembly was reciprocally engaged with piston means and was actuated by power means to displace said piston means and energize the friction members of said friction device which were connected with said piston means. An undesirable feature of the past wedge actuated friction devices was that when the power means were disassembled from said friction devices for repair purposes or for shipping and/or palletizing purposes, the cage and roller assembly and, in some cases, the wedge for actuating said cage and roller assembly were displaceable from said friction device.

The principal object of the present invention is to provide a friction device which overcomes the abovementioned undesirable features.

Another object of the present invention is to provide a friction device having a displaceable friction member adapted to be adjustably repositioned for wear compensation purposes and means which obviate adjustable displacement of said friction member in excess of a predetermined amount.

Another object of the present invention is to provide means for adjustably displacing a friction member of a friction device which provide a warning to the operator when the friction lining on said friction member becomes worn to a degree warranting replacement.

Another object of the present invention is to provide a friction device adjusting mechanism having a pair of adjustable members defining the retracted position of a friction element with a lost motion or movement limiting connection therebetween to predeterminately limit adjustable repositioning of said retracted position.

Another object of the present invention is to provide a friction device adjusting mechanism having an extendable member with an adjustable member controlling the extension thereof wherein said extendable member is moved into locking engagement with said adjustable member upon predetermined extension of said extendable member.

Another object of the present invention is to provide a friction device having friction members of which maximum wear occasioned by frictional engagement is predetermined.

Another object of the present invention is to provide a friction device in which effective energization is affected to thereby afford the vehicle operator a warning that the friction members of said friction device are approaching a degree of wear necessitating replacement.

Another object of the present invention is to provide a friction device having force responsive means for normally displacing a friction member into frictional engagement and means for adjustably displacing said friction member to compensate for friction member wear occasioned upon frictional engagement including means for preventing said adjustable displacement in excess of a predetermined maximum amount.

Another object of the present invention is to provide a friction device having force responsive means with a predetermined maximum travel for normally displacing a friction member into frictional engagement and means for affecting predetermined maximum adjustable displacement of said friction member to compensate for wear occasioned upon frictional engagement, said maximum travel and maximum adjustable displacement being additive to predeterminately define the maximum or total permissible wear of said friction member.

Another object of the present invention is to provide a friction device having a displaceable friction member for which normal and adjustable displacement is predeterminately limited to define the effective energization limit of said friction device.

Another object of the present invention is to provide a friction device in which the effective energization is predeterminately limited to obviate irreparable damage to said friction device and/or the component parts thereof.

Another objects of the present invention is to provide a resilient cage member for retaining actuating rollers of a wedge actuated type friction device.

Another object of the present invention is to provide cage and roller assembly for a wedge actuated type friction device which is retained against displacement from said friction device.

And still another object of the present invention is to provide a cage and roller assembly which maintains continuous engagement with the friction member displacing elements of a wedge actuated type friction device irrespective of operative engagement of an operating wedge with said cage and roller assembly.

And still another object of the present invention is to provide a cage and roller assemly for a wedge actuated type friction device in which relative movement between said cage and rollers is obviated upon operative engagement with an operating wedge.

And still another object of the present invention is to provide a cage and roller assembly and an operating wedge therefor for a wedge actuated type friction device including means for retaining said cage and roller assembly and said wedge against displacement from said friction device.

And a still further object of the present invention is to provide fluid pressure responsive actuating means for a wedge actuated type friction device which can be removed therefrom without occasioning displacement of cooperating component parts from said friction device.

And yet a still further object of the present invention is to provide fluid pressure responsive actuating means for a wedge actuated type friction device including movement limiting means which predeterminately limit the normal friction engaging displacement of the friction elements of said friction device.

Briefly, the invention embodies a friction device having a friction member normally displaceable by actuator means and adjustably displaceable by adjusting means wherein said normal and adjustable displacements are additive and predetermined to define the limit of effective friction device energization. In other words, the actuator means have a predetermined maximum travel for movably displacing the friction member to effect friction device energization, and the adjusting means are provided for adjustably displacing said friction member to compensate for friction member wear occasioned upon friction device energization including means for preventing said adjustable displacement of said friction member in excess of a predetermined maximum amount, said maximum travel and said maximum adjustable displacement being additive to predetermine or define the permissible total wear of said friction member. The invention also comprises an adjusting mechanism for a friction member of a friction device including a pair of relatively movable adjusting members having a lost motion or motion limiting connection therebetween for limiting the adjustable displacement or travel of said friction member. Further, the invention additionally comprises a self-contained resilient cage and roller assembly for a wedge operated friction device including means for preventing undesired displacement thereof from said friction device.

The invention also consists in the parts and arrangement and combinations of parts hereinafter described and claimed in the following specification, reference being had tot he accompanying drawings which form a part of said specification.

Figure 2:
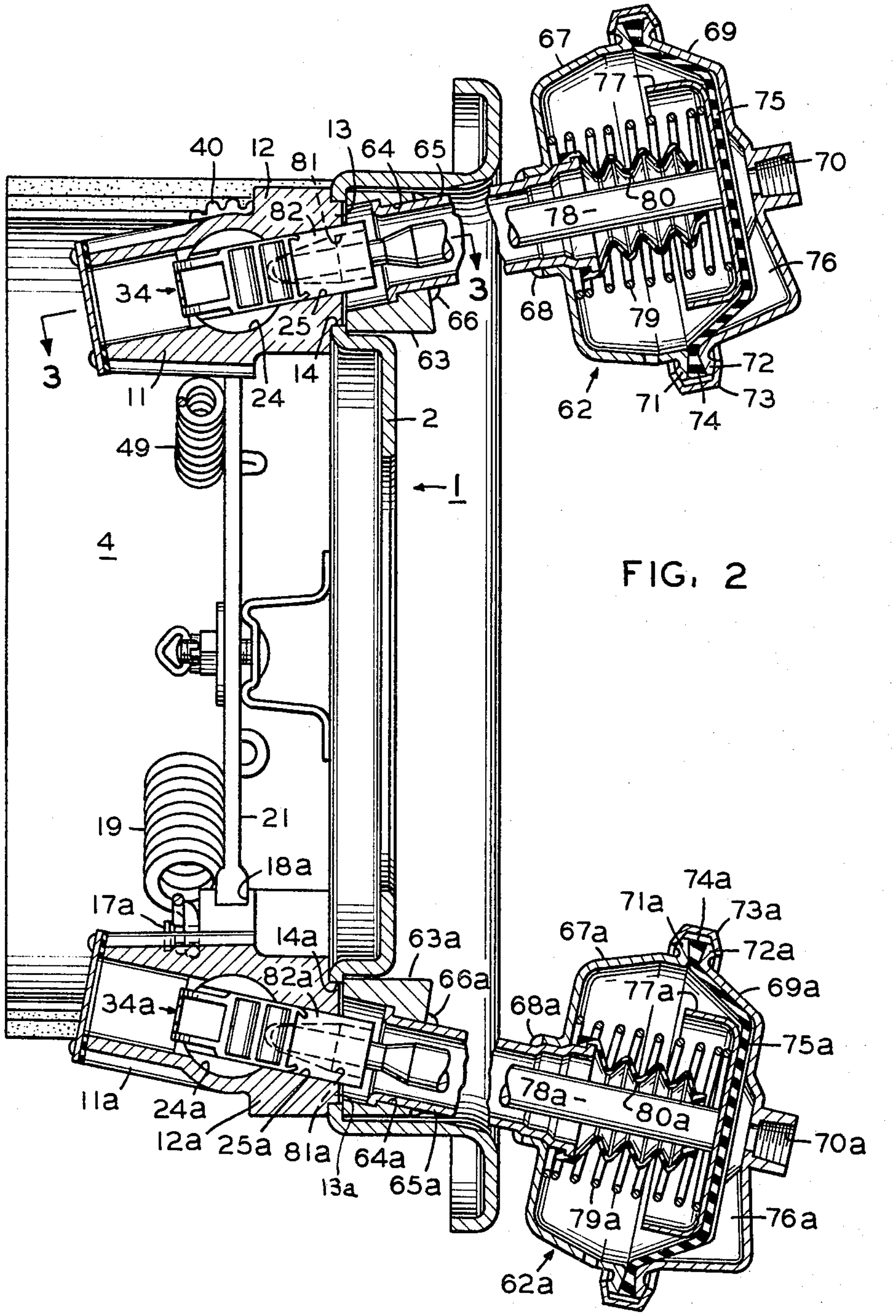
Figures 3, 5, 6, 7, 8:
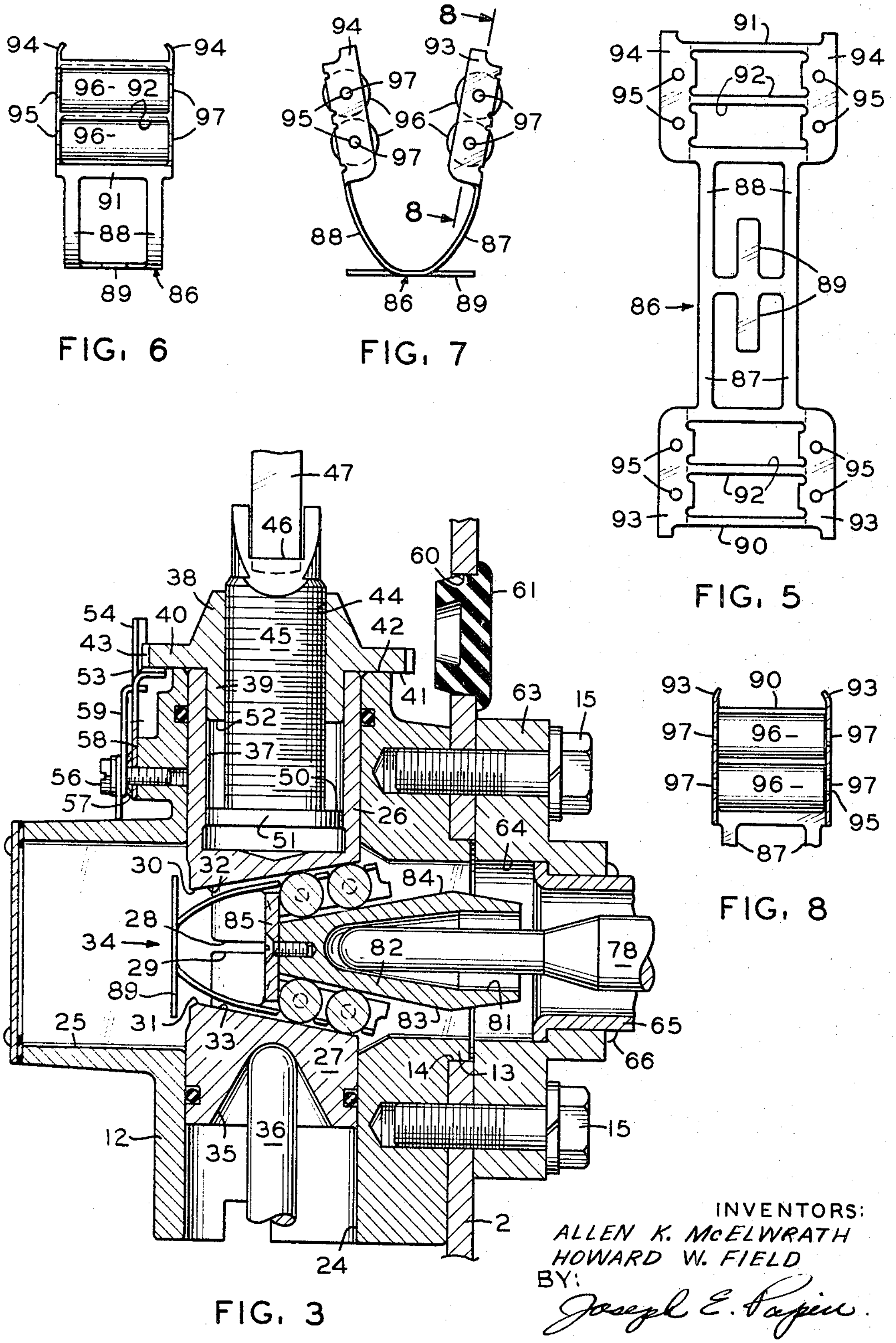
Figure 9:
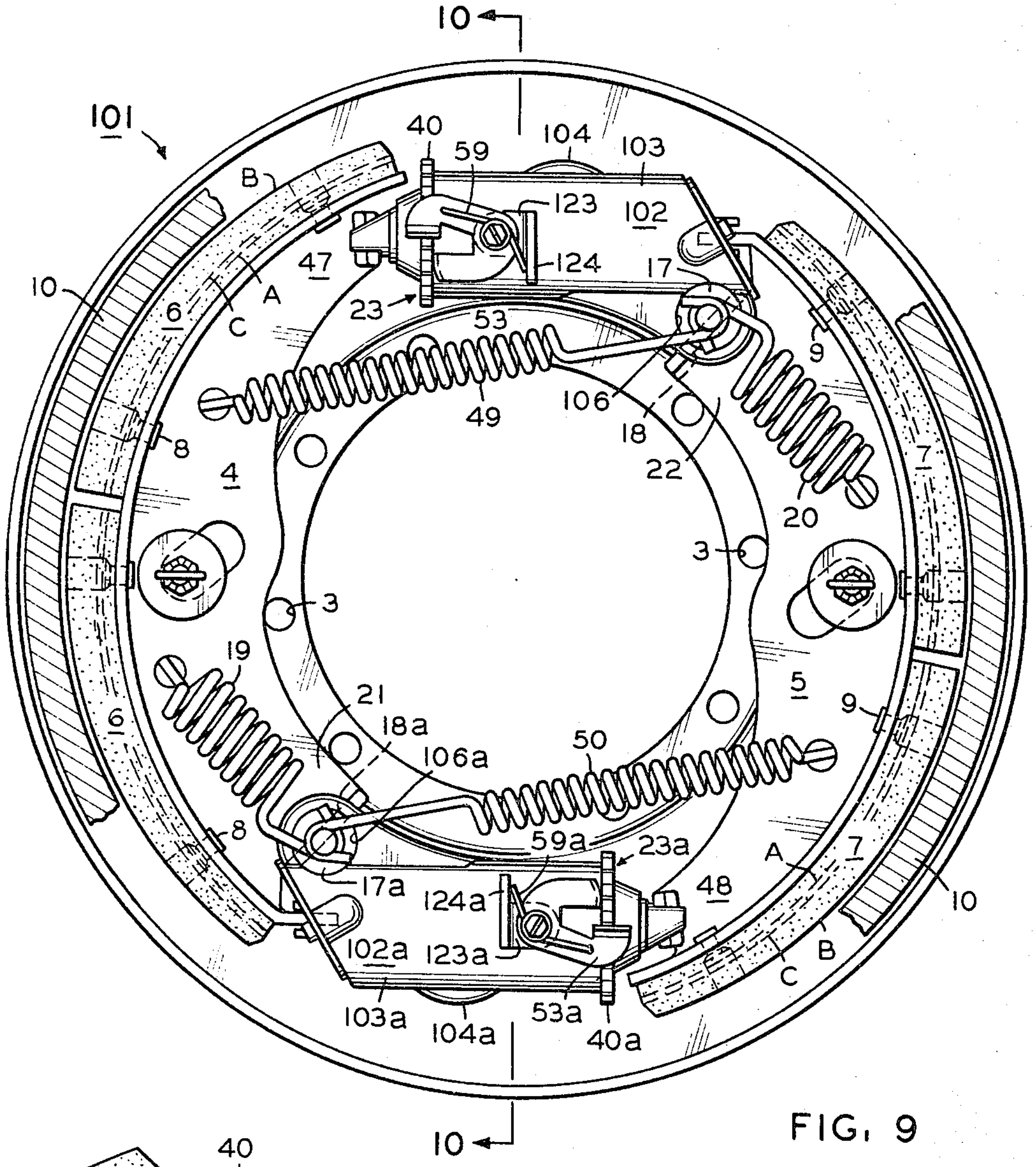
Figure 11:
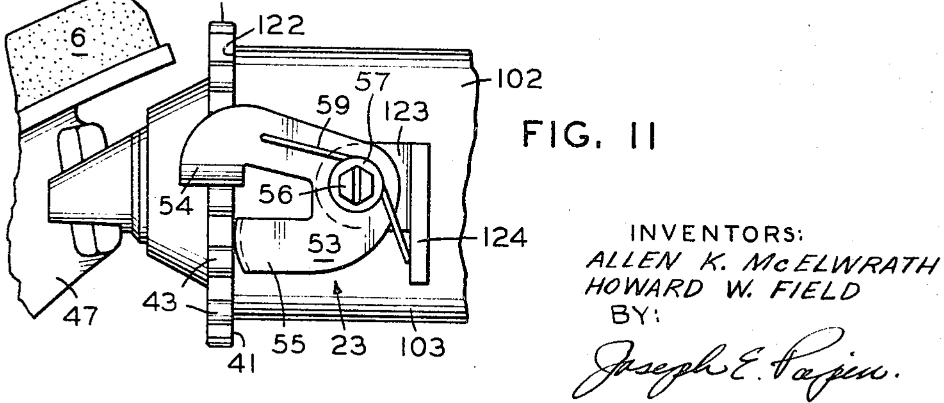
Figures 10, 12:
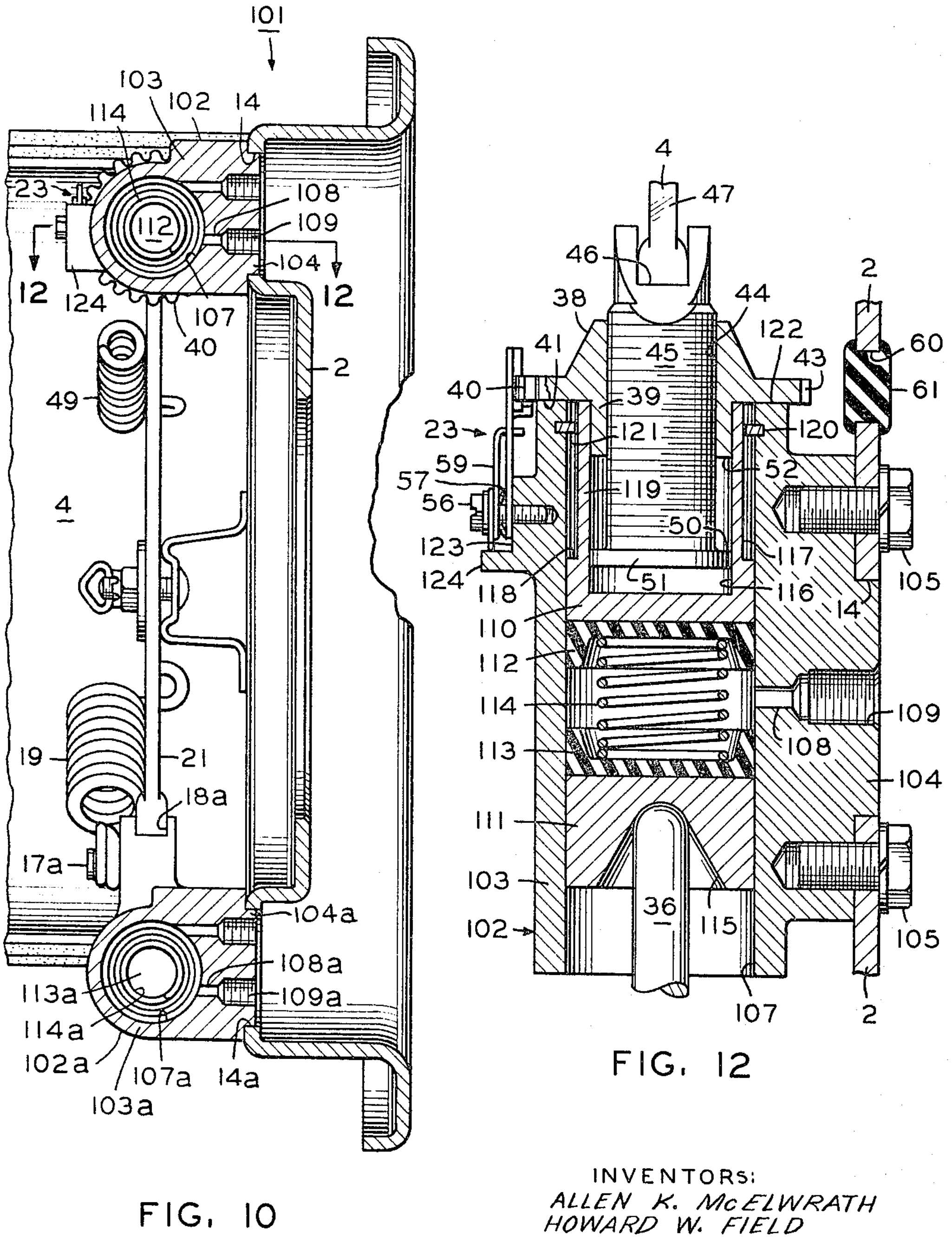
Figure 13:
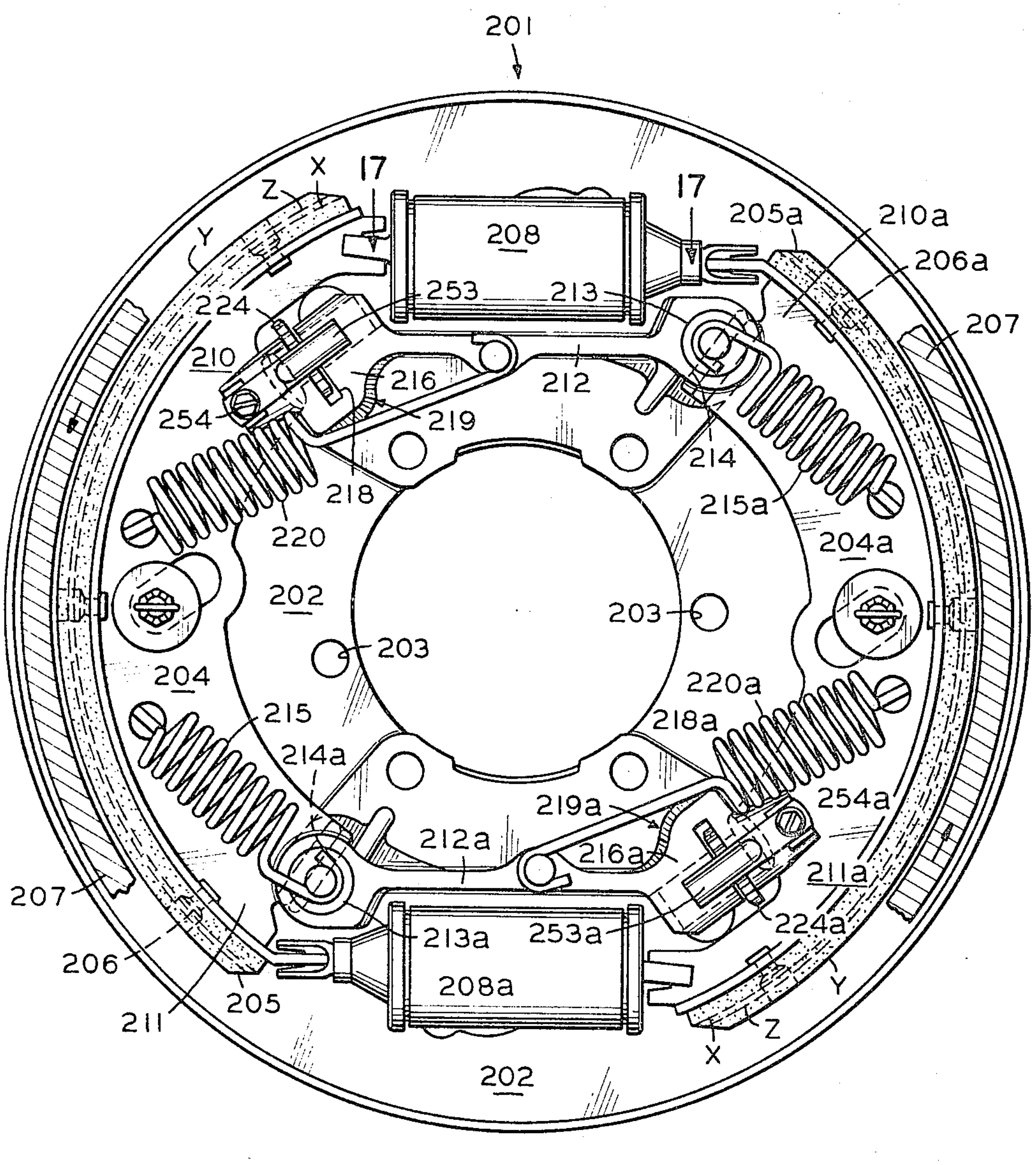
Figures 14, 15, 16, 17:
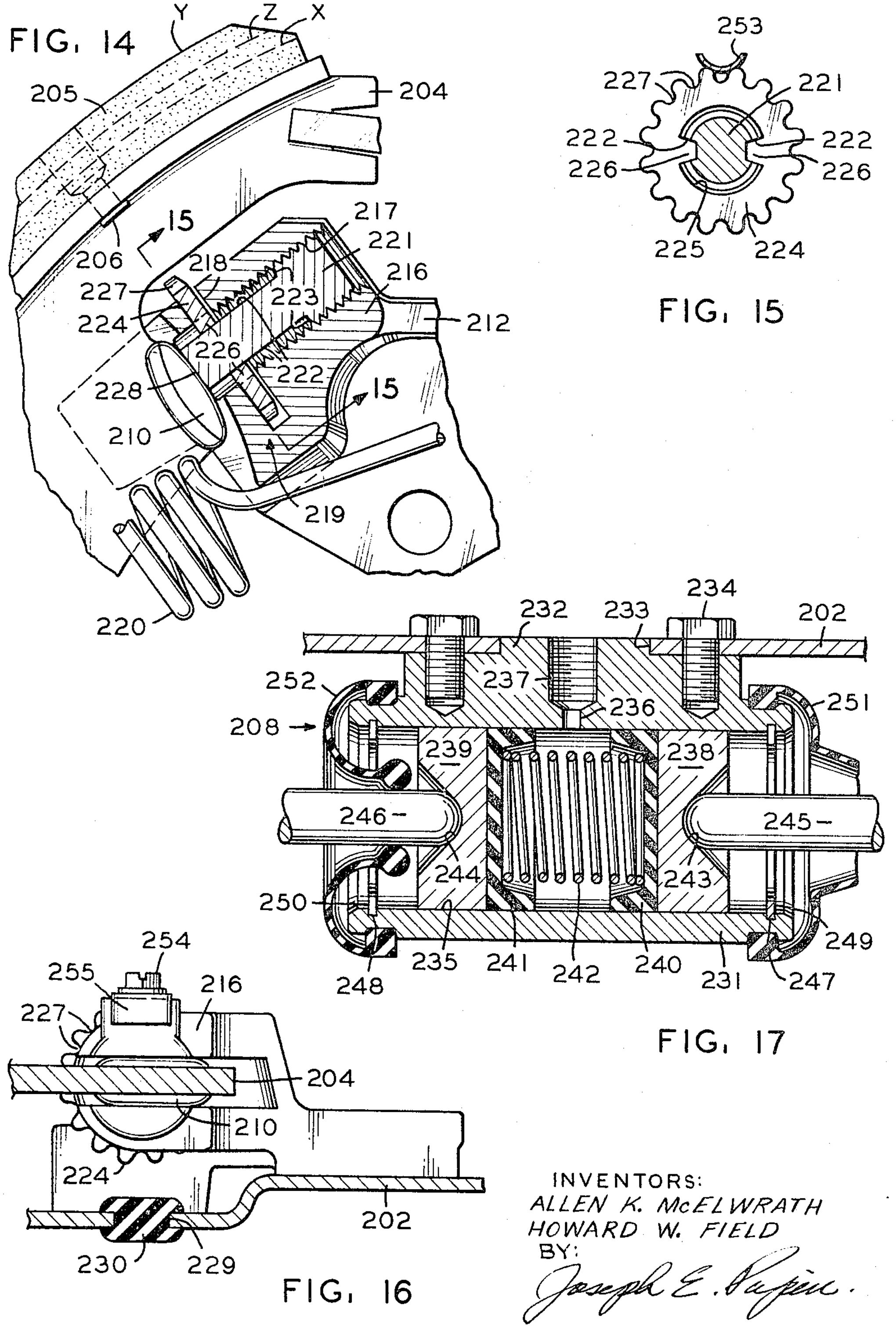

In the drawings which illustrate embodiments of the invention,

FIG. 1 is an elevational view of a friction device embodying the present invention, FIG. 2 is a partial sectional view taken along line 2—2 of FIG. 1, FIG. 3 is a sectional view taken along line 3—3 of FIG. 2, FIG. 4 is a greatly enlarged fragmentary view taken from FIG. 1, FIG. 5 is a greatly enlarged elevational view of a stamped cage member prior to assembly with the roller or anti-friction members employed in the friction device of FIG. 1, FIG. 6 is an elevational view of the assembled cage and roller assembly employed in the friction device of FIG. 1, FIG. 7 is a right-side view of the assembled cage and roller assembly of FIG. 6, FIG. 8 is a partial sectional view taken along line 8—8 of FIG. 7, FIG. 9 is an elevational view of another friction device embodying the present invention, FIG. 10 is a partial sectional view taken along line 10—10 of FIG. 9, FIG. 11 is a greatly enlarged fragmentary view taken from FIG. 9, FIG. 12 is a sectional view taken along line 12—12 of FIG. 10, FIG. 13 is an elevational view of another friction device embodying the present invention, FIG. 14 is a greatly enlarged fragmentary view showing the adjustment mechanism of the friction device of FIG. 1 in cross-section, FIG. 15 is a partial sectional view taken along line 15—15 of FIG. 14, FIG. 16 is a left-hand view of FIG. 14, and FIG. 17 is a sectional view taken along line 17—17 of FIG. 13.

Referring now to FIGS. 1–4 in particular, a friction device or wheel brake assembly 1 is provided with supporting means or a backing plate 2 having a plurality of centrally located mounting apertures 3 therein for connection with a vehicle axle flange (not shown). A pair of opposed, radially displaceable friction members or brake shoes 4, 5 are slidably disposed on the backing plate 2 having friction material or linings 6, 7 secured thereto by a plurality of rivets, or the like, 8, 9, said linings being adapted for frictional engagement with a relatively rotatable friction producing member or brake drum 10 which is secured to a vehicle axle (not shown). The linings 6, 7 are provided with a maximum or total permissible wear capacity or limit defined by a dotted line A spaced from the original friction surface B of said linings and juxtaposed with the rivets 8, 9 radially outwardly thereof. The permissible wear limit A is predeterminately defined for the linings 6, 7 in order to prevent damaging engagement of the rivets 8, 9 or the brake shoes 4, 5 with the drum 10, said linings are also provided with a predetermined or maximum adjustable wear limit defined by a dotted line C spaced between the original friction surface B and the permissible wear limit A, as will be fully discussed hereinafter. If the linings 6, 7 are secured to the shoes 4, 5 by the well-known method of bonding, then the maximum wear limit A would, of course, be juxtaposed with the brake shoe tables radially outwardly thereof.

A pair of opposed actuator motors or wheel cylinders **11, 11*a* is provided with housings 12, 12*a* having integral mounting hubs 13, 13*a* respectively protruding through a pair of diametrically opposed openings 14, 14*a* in the backing plate 2, and said housings are secured to said backing plate by suitable means, such as studs 15. The wheel cylinder housings 12, 12*a* are provided with anchor pin apertures 16, 16*a* in which anchor pins 17, 17*a* are pivotally mounted, said anchor pins having radially extending anchoring surfaces or slots 18, 18*a*. Return springs 19, 20 are connected between the brake shoes 4, 5 and the anchor pins 17, 17*a* to normally urge the normally anchored ends 21, 22 of the brake shoes 4, 5 into sliding anchoring engagement with the anchoring surfaces 18, 18*a***.

Since the internal component parts of the wheel cylinders **11, 11*a* and the component parts of the adjusting or motion translating mechanisms, indicated generally at 23, 23*a*, are for all practical purposes of identical construction and configuration and function in the same manner, only the wheel cylinder 11 and adjusting mechanism 23 are shown in detail in FIGS. 3 and 4; however, the corresponding internal component parts of the wheel cylinder 11*a* and the corresponding component parts of the adjusting mechanism 23*a* are also described hereinafter. The wheel cylinder housings 12, 12*a* are provided with bores 24, 24*a* therethrough intersected by stepped cross-bores or passages 25, 25*a* which extend through the wheel cylinder hubs 13, 13*a*. A pair of pistons or force receiving members 26, 26*a* and 27, 27*a* is slidable in the housing bores 24, 24*a* and are provided with interior abutment ends 28, 28*a* and 29, 29*a* which are adjacently spaced and opposed in said housing bores. Grooves 30, 30*a* and 31, 31*a* are provided in the piston interior ends 28, 28*a* and 29, 29*a* having inclined or convergent bottom surfaces 32, 32*a* and 33, 33*a*, and resilient, self-contained cage and roller assemblies having a generally U-shaped configuration, to be fully discussed hereinafter, are indicated generally at 34, 34*a*, said cage and roller assemblies being reciprocally received in said grooves and normally biased into continuous operative engagement with said inclined surfaces. The pistons 27, 27*a* are provided with recesses 35, 35*a* in the exterior ends thereof, and links 36, 36*a* have one end pivotally received in said recesses while the other ends thereof are operatively connected with the brake shoe ends 21, 22**.

Annular recesses or blind bores **37, 37*a* are provided in the exterior ends of pistons 26, 26*a*, and rotatable adjustable members 38, 38*a* are provided with axial or cylindrical portions 39, 39*a* which are slidably and rotatably received in the piston bores 37, 37*a*. The rotatable members 38, 38*a* are also provided with radially extending adjustment flanges or starwheels 40, 40*a* integrally formed on the cylindrical portions 39, 39*a*, and radially extending abutment surfaces 41, 41*a* are provided on the starwheel members 40, 40*a* for abutting and bearing engagement with cooperating annular surfaces 42, 42*a* formed on the housings 12, 12*a* about the bores 24, 24*a*. The peripheral surfaces of the starwheel members 40, 40*a* are provided with a plurality of successive axially extending grooves or notches 43, 43*a* therein, and axial threaded bores 44, 44*a* are also provided through the adjustable members 38, 38*a* which cooperably receive threaded extendable members or struts 45, 45*a* having shoe guide slots or anchoring sufaces 46, 46*a* in the outer or exterior ends thereof for sliding anchoring and retaining engagement with the normally displaceable ends 47, 48 of the brake shoes 4, 5. Return springs 49, 50 are interposed between anchor pins 17, 17*a* and brake shoes 4, 5, normally serving to maintain the brake shoe ends 47, 49 engaged with the shoe guide slots 46, 46*a* and the radial abutment surfaces 41, 41*a* on the starwheel members 40, 40*a* in engagement with the wheel cylinder housing abutment surfaces 42, 42*a***.

One of the features of the present invention is concerned with limiting the adjustable travel or displacement of the brake shoes 4, 5 relative to the drum 10 in excess of a predetermined amount to prevent damaging engagement of the rivets 8, 9 or said brake shoes with said drum upon frictional engagement when the friction surfaces of said linings are sufficiently worn to a degree warranting replacement thereof. For this purpose, lost motion or movement limiting connections are provided between the adjustable members **38, 38*a* and the extendable struts 45, 45*a*. The movement limiting connections are defined by abutment surfaces 50, 50*a* provided on annular flanges 51, 51*a* formed on the interior ends of struts 45, 45*a* and slidable in piston bores 37, 37*a*, and by cooperating abutment surfaces 52, 52 provided on the interior ends of the cylindrical portions 39, 39*a* of the adjustable members 38, 38*a***.

The automatic adjusting or motion translating mechanisms **23, 23*a* include adjuster members or bodies 53, 53*a* having driving or lever arms 54, 54*a* normally engaged with one of the notches 43, 43*a* on the starwheels 40, 40*a*, and following or abutment arms 55, 55*a* normally engaged with the radial abutment surfaces 41, 41*a* on said starwheels. The adjustor bodies 53, 53*a* are pivotally mounted on pivot pins 56, 56*a* which are threadedly received in the wheel cylinder housings 12, 12*a*, and spring or deflection washers 57, 57*a* carried on said pivot pins normally urge said adjustor bodies toward a normal operating plane in bearing engagement with bearing surfaces 58, 58*a* on said wheel cylinder housing. Relatively light adjustor springs 59, 59*a* carried on the pivot pins 56, 56*a* and biased between the adjustor bodies 53, 53*a* and the wheel cylinder housing 12, 12*a* normally urge the following arms 55, 55*a* in a direction toward abutting or following engagement with the radial abutment surfaces 41, 41*a* on the starwheels 40, 40*a* while urging the driving arms 54, 54*a* in a direction toward disengagement from the notches 43, 43*a* on said starwheels. In addition to the above described automatic adjusting mechanisms 23, 23*a*, means are also provided for manual adjustment of the friction device 1 including diametrally opposed access openings 60, of which only one is shown in FIG. 3, provided in the backing plate 2 for adjusting tool insertion purposes. The access openings 60 are positioned substantially in axial alignment with the starwheels 40, 40*a* of the adjustable members 38, 38*a*, and resilient closure members or grommets 61 are normally removably secured in said access openings 60 to prevent the entry of foreign material into the interior of the friction device 1**.

Referring now to FIG. 2 in particular, the friction device 1 is provided with fluid pressure responsive actuating mechanisms, generally indicated at **62, 62*a*. Mounting blocks 63, 63*a* are removably secured on the backing plate 2 about the openings 14, 14*a* therein by the studs 15 and are provided with bores 64, 64*a* therein substantially in alignment with the cross bores 25, 25*a* of the wheel cylinder housings 12, 12*a*. Tubular members or supporting sleeves 65, 65*a* have one end extending into the mounting block bores 64, 64*a* and are connected to the mounting blocks 63, 63*a* by suitable means, such as welds 66, 66*a*. The other ends of the sleeves 65, 65*a* extend into cup-shaped end plates 67, 67*a* of the actuating mechanisms 62, 62*a*, and said sleeves are connected thereto by suitable means, such as welds 68, 68*a*. The actuating mechanisms 62, 62*a* are also provided with opposed cup-shaped housings 69, 69*a* having service or inlet ports 70, 70*a* therein, and the housings 67, 67*a* and 69, 69*a* are provided with opposed peripheral flanges 71, 71*a* and 72, 72*a*. Conventional clamping bands 73, 73*a* are removably secured in clamping engagement with the flanges 71, 71*a* and 72, 72*a*, and the compressive force of said clamping engagement serves to clamp peripheral beads 74, 74*a* of diaphragms 75, 75*a* between said flanges, said diaphragms defining with the housings 69, 69*a* actuating chambers 76, 76*a* in open pressure fluid communication with the inlet ports 70, 70*a*. Cup-shaped plates or retainers 77, 77*a* are connected with one end of the push rods 78, 78*a* and are normally biased into engagement with diaphragms 75, 75*a* which in turn, are biased into engagement with the housings 69, 69*a* by return springs 79, 79*a* interposed between the housings 67, 67*a* and said retainers. It should be noted that the retainers 77, 77*a* are positioned a predetermined distance from the housings 67, 67*a* to limit the friction device energizing stroke or displacement of the push rods 78, 78*a*. Resilient boots 80, 80*a* are interposed between the push rods 78, 78*a* and the end of the sleeves 65, 65*a* extending into the housings 67, 67*a* to prevent the entry of foreign particles into said housings. The push rods 78, 78*a* extend through the sleeves 65, 65*a* and the mounting block bores 64, 64*a*, and the other ends of said push rods are pivotally received in recesses 81, 81*a* provided in wedge members 82, 82*a*, FIGS. 2 and 3. The wedge members 82, 82*a* are reciprocally maintained in the wheel cylinder cross bores 25, 25*a* and are provided with opposed inclined or convergent surfaces 83, 83*a* and 84, 84*a* which are positioned in operative engagement with the cage and roller assemblies 34, 34*a*. Displacement preventing members 85, 85*a* are connected with the free ends of the wedge members 82, 82*a* for engagement with the cage and roller assemblies 34, 34*a* to prevent displacement or separation therefrom in the event that the actuating mechanisms 62, 62*a* are removed from the friction device 1** for servicing or shipping or the like.

Another feature of the present invention is the previously mentioned cage and roller assemblies **34, 34*a*; however, since said cage and roller assemblies have the same component parts and function in the same manner, only the cage and roller assembly 34 is shown in FIGS. 5–8, but the corresponding component parts of the cage and roller assembly 34*a* are also designated hereinafter. The cage and roller assemblies 34, 34*a* are provided with integrally formed body portions, indicated generally at 86, 86*a*, stamped or formed from sheet metal or the like. The bodies 86, 86*a* are provided with oppositely extending resilient arms 87, 87*a* and 88, 88*a* and a retaining tab or displacement preventing member 89, 89*a* is integrally formed between the resilient arms. Enlarged end members or roller retainers 90, 90*a* and 91, 91*a* are integrally formed on the opposed ends of the resilient arms 87, 87*a* and 88, 88*a* having a plurality of transverse roller receiving or guide slots 92, 92*a* therein, respectively, and said end members also define opposed, wing-like side or bearing supporting members 93, 93*a* and 94, 94*a* having spaced trunnion receiving or bearing apertures 95, 95*a* therein, respectively. The supporting members 93, 93*a* and 94, 94*a* are folded or bent along the dotted lines shown in FIG. 5 for purposes of illustration so as to be substantially normal to the end members 90, 90*a* and 91, 91*a*, as shown in FIGS. 6–8, and the resilient arms 87, 87*a* and 88, 88*a* are also bent so as to provide the aforementioned substantially U-shaped or hair pin type spring configuration for the assemblies 34, 34*a*. With the resilient arms 87, 87*a* and 88, 88*a* bent into the generally U-shaped configuration, the retaining tabs 89, 89*a* are substantially tangential to said arms being positioned adjacent to the closed end or bottom of said U-shaped configuration of the bodies 86, 86*a*. Roller or anti-friction bearings 96, 96*a* are positioned in the guide slots 92, 92*a* of the end members 90, 90*a* and 91, 91*a* and are provided with trunnions 97, 97*a* on the opposed ends thereof which are rotatably journalled in the bearing apertures 95, 95*a* of the support members 93, 93*a* and 94, 94*a*, said support members serving as guides or abutments for the opposed ends of said bearings about said trunnions. The peripheral surfaces of the rollers 96, 96*a* protrude through the guide slots 92, 92*a* beyond the bodies 86, 86*a* for anti-friction engagement with the inclined surfaces 32, 32*a* and 33, 33*a* on the interior ends 28, 28*a* and 29, 29*a* of the wheel cylinder pistons 26, 26*a* and 27, 27*a*, said peripheral surfaces of said rollers also extend beyond the free edges of the support members 93, 93*a* and 94, 94*a* for anti-friction engagement with the opposed inclined surfaces 83, 83*a* and 84, 84*a* of the wedge members 82, 82*a*. Referring now to FIGS. 2 and 3 to complete the description of the friction device 1, the retaining tabs 89, 89*a* of the cage and roller assemblies 34, 34*a* are adapted for engagement with the interior ends 28, 28*a* and 29, 29*a* of the wheel cylinder pistons 26, 26*a* and 27, 27*a* to prevent displacement of the cage and roller assemblies 34, 34*a* and the wedges 82, 82*a* through the wheel cylinder housing crossbores 25, 25*a* in the event the actuating mechanisms are removed from the friction device 1 for servicing or shipping purposes, or the like; and of course, it is apparent that said retaining tabs could be constructed to engage the wheel cylinder housings 12, 12*a* or other component parts of the friction device 1** in the proximity of said cage and roller assemblies if desired.

In the operation of the friction device 1, FIGS. 1–4, assume that the friction linings 6, 7 are sufficiently worn to warrant adjustment of said friction device and that the component parts of said friction device are positioned as previously described. Fluid pressure simultaneously applied into the service chambers **76, 76*a* of the actuating mechanisms 62, 62*a* acts on the effective areas of the diaphragms 75, 75*a* creating an applying or actuating force to move the diaphragm retainers 77, 77*a*, the push rods 78, 78*a* and the wedges 82, 82*a* leftwardly in a friction device energizing direction. This leftward movement of the wedges 82, 82*a* effect movement of the cage assemblies 34, 34*a* in that the rollers 96, 96*a* are moved up the inclined wedge surfaces 83, 83*a* and 84, 84*a* and up the inclined end surfaces 32, 32*a* and 33, 33*a* of the pistons 26, 26*a* and 27, 27*a* thereby spreading or stressing the resilient arms 87, 87*a* and 88, 88*a* of said cage assemblies and effecting concert movement of said pistons from their normal or retracted positions in the wheel cylinder housing bores 24, 24*a* in an outward or friction member displacing direction, and the starwheel members 40, 40*a* and struts 45, 45*a* are concertly moved with the pistons 26, 26*a*. In this manner, the displaceable brake shoe ends 47, 48 are radially displaced from their normally retracted positions against the compressive force of the return springs 49, 50 to pivotally and slidably displace the anchoring brake shoe ends 21, 22 on the anchor pins 17, 17*a*. This displacement movement of the brake shoes 4, 5 in response to the actuating force frictionally engages the linings 6, 7 with the rotating drum 10 to energize the friction device 1** in the forward direction, as indicated by the directional arrow in FIG. 1.

Since it was assumed that an adjustment of the friction device 1 was warranted, the compressive forces of the adjustor springs **59, 59*a* pivot the adjustor bodies 53, 53*a* in opposite directions on the pivot pins 56, 56*a* to maintain the following arms 55, 55*a* in following or abutting engagement with the radial abutment shoulders 41, 41*a* on the starwheel members 40, 40*a* as said starwheel members are displaced by the actuating forces. This pivotal movement of the adjustor bodies 53, 53*a* serves to pivot the driving arms 54, 54*a* out of driving engagement with the cooperating starwheel notches 43, 43*a*, and the deflection force of the spring washers 57, 57*a* subsequently deflects or moves said adjustor bodies into its normal operating place in bearing engagement with the bearing surfaces 58, 58*a* on the wheel cylinder housings 12, 12*a* so as to drivingly engage said driving arms with the next successive starwheel member notches 43, 43*a***.

When the friction device 1 is de-energized, the actuating forces on the wedges **82, 82*a* and cage assemblies 34, 34*a* are eliminated by exhausting the fluid pressure from the service chambers 75, 75*a* of the actuating mechanisms 62, 62*a* and the retainer springs 79, 79*a* move the component parts of said actuating mechanisms to their original positions while the compressive forces of the return springs 49, 50 move the brake shoes 4, 5 toward their retracted positions which, in turn, move the struts 45, 45*a* and the starwheel members 40, 40*a* with the pistons 26, 26*a* and 27, 27*a* inwardly in the wheel cylinder bores 24, 24*a* toward their original positions. The cage assemblies 34, 34*a* are also returned toward their original positions in response to the return movement of the wedges 82, 82*a* and the pistons 26, 26*a* and 27, 27*a* wherein the resilient arms 87, 87*a* and 88, 88*a* thereof are relaxed or unstressed while maintaining the rollers 96, 96*a* engaged with said pistons. Since the following arms 55, 55*a* are biased into following engagement with the abutment surfaces 41, 41*a* of the starwheel members 40, 40*a*, this return movement of said starwheel members pivots the adjustor bodies 53, 53*a* in opposite return directions about the pivot pins 56, 56*a* against the compressive force of the adjustor springs 59, 59*a* so as to return said adjustor bodies to their original positions. This return pivotal movement of the adjustor bodies 53, 53*a* serves to pivot the driving arms 54, 54*a* to their original positions, and since said driving arms are drivingly engaged with the next successive notches 43, 43*a* of the starwheel members 40, 40*a*, as previously mentioned, the return pivotal movement of said driving arms adjustably drives or rotates said starwheel members in the recesses 37, 37*a* of the pistons 26, 26*a*. Since concert rotation of the struts 45, 45*a* with the starwheel members 40, 40*a* is prevented by the guiding engagement between the strut slots 46, 46*a* and the brake shoe ends 47, 48, the adjustable rotation of the starwheels 40, 40*a* effects further threaded engagement between the threaded bores 44, 44*a* thereof and said struts to extend said struts outwardly and adjust the retracted postiions of the brake shoes 4, 5. In this manner, the extension of the struts 45, 45*a* adjustably displaces or spreads the shoe ends 47, 48 to adjust the position of the friction linings 6, 7 relative to the drum 10, or, in other words, to adjustably reposition the retracted positions of the brake shoes 4, 5, and thereby adjust the friction device 1**.

Continued wear of the friction linings 6, 7 will, of course, occasion further adjustable displacement of the brake shoes 4, 5 in the same manner as previously described until such wear reduces the original friction surface B of said linings to the maximum adjustable limit wear C. The maximum adjustable wear limit C for the linings 6, 7 is predetermined by the movement limiting connection between the abutment surfaces 50, 50*a* on the strut flanges 51, 51*a* and the abutment surfaces 52, 52*a* on the starwheel member cylindrical portions 39, 39*a*. In other words, continued extension of the struts 45, 45*a* by adjusting rotation of the starwheel members 40, 40*a*, as previously described, in response to continued lining wear slidably moves the strut flanges 51, 51*a* in the piston bores 37, 37*a* toward the adjustable members 38, 38*a* until the flange abutment surfaces 50, 50*a* are positioned in locking engagement with the abutment surfaces 52, 52*a* on said adjustable members. The distance the abutment surfaces 50, 50*a* must move into engagement with said abutment surfaces 52, 52*a* defines or predetermines the maximum adjustable displacement of the brake shoes 4, 5 which is the same as the difference between the original friction surface B and the maximum adjustable wear limit C of the linings 6, 7. The locking engagement between the flange abutment surfaces 50, 50*a* and the adjustable member abutment surfaces 52, 52*a* obviates further adjusting rotation of the starwheel members 40, 40*a* as well as further extension of the struts 45, 45*a* to positively prevent further adjustable displacement of the brake shoes 4, 5 in excess of the predetermined amount defined by the maximum adjustable wear limit C. It should be noted that this locking engagement provides the operator with a warning that the friction linings 6, 7 are worn to a degree warranting replacement thereof. For instance, if the operator removes the grommets 60 from the backing plate access openings 61 and inserts an adjusting tool, such as a screwdriver or the like (not shown), into manual driving engagement with the starwheel notches 43, 43*a* to adjustably rotate the starwheels 40, 40*a*, the aforementioned locking engagement prevents such adjusting rotation and thereby provides the warning to the operator that the friction linings 6, 7 should be replaced.

The friction device 1 is further energizable subsequent to the locking engagement between the adjustable members 38, 38*a* and struts 45, 45*a* by the aforementioned actuation forces on the wedges 82, 82*a* and the cage assemblies 34, 34*a* substantially in the same manner as previously described with the following exceptions. The wedges 82, 82*a* and cage assemblies 34, 34*a* are movable in response to the actuation forces between their fully retracted positions and their full or maximum travel positions on the piston inclined surfaces 32, 32*a* and 33, 33*a* to effect further displacement movement of the pistons 26, 26*a* and 27, 27*a* to move the brake shoes 4, 5 from their retracted positions at the maximum adjustable displacement thereof, as defined by the aforementioned locking engagement, to frictionally engage the linings 6, 7 with the drum 10. The adjustor bodies 53, 53*a* are pivotally movable in response to this displacement movement of the shoes 4, 5; however, since the adjustable members 38, 38*a* and struts 45, 45*a* are in locked engagement, the driving arms 54, 54*a* of said adjustor bodies merely jump between engagement with one of the notches 43, 43*a* on the starwheels 40, 40*a* and the next successive notch during such pivotal movement without adjustably driving said starwheels. It should be noted that as the friction linings wear, as occasioned by such further frictional engagement, approaches the maximum or total permissible wear limit A, the movement of the cage assemblies 34, 34*a* on the piston inclined surfaces 32, 32*a* and 33, 33*a* and the wedge inclined surfaces 83, 83*a* and 84, 84*a* approaches a maximum travel or movement and the resulting travel or movement of the pistons 26, 26*a* and 27, 27*a* in the wheel cylinder housing bores 24, 24*a* also approaches a maximum travel or movement. It is therefore obvious that the maximum travel or movement of the pistons 26, 26*a* subsequent to the locking engagement of the adjustable members 38, 38*a* and struts 45, 45*a* defines or predetermines the permissible excess wear of the friction linings 6, 7 between the maximum adjustable wear limit C and the total permissible wear limit A. Therefore, since the maximum adjustable displacement of the shoes 4, 5 defines the maximum adjustable wear limit C and the maximum travel of the pistons 26, 26*a* in response to actuation of the wedges and the cage and roller assemblies 34, 34*a* defines the permissible excess wear between said maximum adjustable wear limit C and the total wear permissible wear limit A, it is apparent that said maximum adjustable displacement is additive to said maximum travel to predeterminately define the total permissible wear capacity or limit (i.e. between A and C) of the friction linings 6, 7. When the linings 6, 7 are worn to the total wear limit C, further energization of the friction device 1 is obviated; however, as the wear of the linings 6, 7 approaches the total wear limit C, the energization of the friction device becomes less effective thereby affording the operator a warning that said linings need replacement.

Referring now to FIGS. 9–11, another friction device 101 is shown having substantially the same component parts and functioning in substantially the same manner as the previously described friction device 1 with the following exceptions. The friction device 101 is provided with opposed actuating mechanisms or wheel cylinders 102, 102*a* operatively interposed between the displaceable and anchoring ends 47, 48 and 21, 22 of the brake shoes 4, 5; however, only the wheel cylinder 102 is shown in detail in FIGS. 10 and 11 for purposes of brevity, but the corresponding component parts of the wheel cylinder 102*a* are also described hereinafter. The wheel cylinder or actuators 102, 102*a* are provided with housings 103, 103*a* having integrally spaced mounting hubs 104, 104*a* which protrude through the openings 14, 14*a* in the backing plate 2, and said housings are secured to said backing plate by suitable means, such as studs 105, 105*a*. The wheel cylinder housings 103, 103*a* also include anchor pin apertures 106, 106*a* in which the anchor pins 17, 17*a* are pivotally mounted with the anchor surfaces 18, 18*a* in anchoring engagement with the anchor ends 21, 22 of the brake shoes 4, 5.

The wheel cylinder housings 103, 103*a* are provided with bores 107, 107*a* intersected by passages 108, 108*a* near the mid-portion thereof, and said passages extend through the mounting hubs 104, 104*a* to connect with inlet or service ports 109, 109*a* which are adapted to be connected with a fluid pressure generating mechanism (not shown). Opposed pistons 110, 110*a* and 111, 111*a* are slidably received in the housing bores 107, 107*a* on opposite sides of the passages 108, 108*a*, and opposed resilient sealing cups 112, 112*a* and 113, 113*a* are sealably interposed between said pistons and said housing bores. Springs 114, 114*a* are interposed between the sealing cups 112, 112*a* and 113, 113*a* to normally position said cups in abutment with the interior ends of the pistons 110, 110*a* and 111, 111*a*. The pistons 111, 111*a* are provided with recesses 115, 115*a* in the exterior ends thereof in which one end of the links 36, 36*a* are pivotally received while the other ends of said links are connected with the anchoring ends 21, 22 of the brake shoes 4, 5. Blind bores or annular recesses 116, 116*a* are provided through the exterior end of the pistons 110, 110*a*, and peripheral recesses 117, 117*a* are provided between said exterior end and radial abutment surfaces 118, 118*a* spaced between the interior and exterior ends of said pistons, said peripheral recesses 117, 117*a* and piston bores 116, 116*a* defining sleeve portions 119, 119*a* on said pistons coaxial with the housing bores 107, 107*a*. The housing bores 107, 107*a* are also provided with annular grooves 120, 120*a* adjacent the rightward end thereof in which abutment members or snap rings 121, 121*a* are positioned, said snap rings being a predetermined distance from the piston abutment surfaces 118, 118*a* to define the maximum stroke or motion limiting movement of the pistons 110, 110*a*.

The cylindrical portions 39, 39*a* of the rotatable members 38, 38*a* are slidably and rotatably received in the piston bores 116, 116*a*, and the abutment surfaces 41, 41*a* of the starwheels 40, 40*a* are normally engaged with the exterior ends of the pistons 110, 110*a* and with annular abutment surfaces 122, 122*a* formed on the rightward end of the wheel cylinder housings 103, 103*a* about the housing bores 107, 107*a*. The struts 45, 45*a* are threadedly received in the threaded bores 44, 44*a* of the rotatable members 38, 38*a*, and the strut flanges 51, 51*a* are slidably received in the piston bores 116, 116*a* wherein the flange abutment surfaces 50, 50*a* and the abutment surfaces 52, 52*a* on the interior ends of said rotatable members define the motion limiting connections between said struts and rotatable members. The shoe guide slots 46 on the exterior end of the struts 45 receive the displacable ends 47, 48 of the brake shoes 4, 5, as previously described. Bearing surfaces 123, 123*a* are also provided on the wheel cylinder housings 103, 103*a* adjacent the leftward end thereof on which the adjusting mechanisms 23, 23*a* are positioned for adjusting engagement with the rotatable members 38, 38*a*, as previously described, and spring bearing hubs 124, 124*a* are also integrally provided on the wheel cylinder housings 103, 103*a* for engagement with the springs 59, 59*a* of said adjustment mechanisms.

In the operation of the friction device 101, assume that the friction linings 6, 7 are sufficiently worn to warrant adjustment of said friction device and that the component parts of said friction device are positioned as above described. Fluid pressure transmitted to the wheel cylinder housing bores 107, 107*a* of the wheel cylinders 102, 102*a* through the service ports and passages 109, 109*a* and 108, 108*a* acts on the effective area of the sealing cups 112, 112*a* and 113, 113*a* creating an actuating force effective to move the pistons 110, 110*a* and 111, 111*a* from their normal or retracted positions in said housing bores in an outward or friction device energizing direction, and the starwheel members 30, 30*a* and struts 45, 45*a* are concertly moved with the pistons 110, 110*a*. In this manner, the displacable brake shoe ends 47, 48 are radially displaced from their normally retracted position against the compressive force of the return springs 49, 50 to pivotally and slidably displace the anchoring brake shoe ends 21, 22 on the anchor pins 17, 17*a*. This displacement movement of the brake shoes 4, 5 in response to the actuating force frictionally engages the linings 6, 7 with the rotating drum 10 to energize the friction device 101 in the forward direction, as indicated by the directional arrow in FIG. 9.

Since it was assumed that the adjustment of the friction device 101 was warranted, the compressive forces of the adjustor springs 59, 59*a* pivot the adjustor bodies 53, 53*a* in opposite directions on the pivot pins 56, 56*a* to maintain the following arms 55, 55*a* in following or abutting engagement with the radial shoulders 41, 41*a* on the starwheel members 40, 40*a*, as said starwheel members are displaced by the actuating forces. This pivotal movement between the adjustor bodies 53, 53*a* serves to move the driving arms 45, 45*a* out of driving engagement with the starwheel notches 43, 43*a*, and the deflection force of the spring washers 57, 57*a* subsequently deflects or moves said adjustor bodies into an operating plane in bearing engagement with the bearing surfaces 123, 123*a* on the wheel cylinder housings 103, 103*a* so as to drivingly engage said driving arms with the next successive starwheel notches 43, 43*a*.

When the friction device 101 is de-energized, the established fluid pressure in the wheel cylinder housing bores 107, 107*a* is exhausted thereby eliminating the actuating forces, and the compressive forces of the return springs 49, 50 move the brake shoes 4, 5 toward their retracted positions which, in turn, moves the struts 45, 45*a* and the starwheel members 40, 40*a* with the pistons 110, 110*a* and 111, 111*a* inwardly in said housing bores toward their original positions. Since the follower arms 55, 55*a* are biased into engagement with the abutment surfaces 41, 41*a* of the starwheel members 40, 40*a* this return movement of said starwheel members pivots the adjustor bodies 53, 53*a* in opposite return directions about the pivot pins 56, 56*a* against the compressive force of the adjustor springs 59, 59*a* so as to return said adjustor bodies to their original positions. This return pivotal movement of the adjustor bodies 53, 53*a* serves to pivot the driving arms 54, 54*a* to their original positions, and since said driving arms are drivingly engaged with the next successive notches 43, 43*a* of the starwheel members 40, 40*a*, as previously mentioned, the return pivotal movement of said driving arms adjustably drives or rotates said starwheel members in the bores 116, 116*a* of the pistons 110, 110*a*. Since concert rotation of the struts 45, 45*a* with the starwheel members 40, 40*a* is prevented by the guiding engagement between the strut slots 46, 46*a* and the brake shoe ends 47, 48 the adjustable rotation of the starwheel members 40, 40*a* effects further threaded engagement between the threaded bores 44, 44*a* thereof and said struts to extend said struts outwardly and adjust the retracted positions of the brake shoes 4, 5. In his manner, the extension of the struts 45, 45*a* adjustably displaces or spreads the shoe ends 47 48 to adjust the position of the friction linings 6, 7 relative to the drum 10 or, in other words, to adjustably reposition the retracted positions of the brake shoes 4, 5, and thereby adjust the friction device 101.

Continued wear of the friction linings 6, 7 will, of course, occasion further adjustable displacement of the brake shoes 4, 5, in the same manner as previously described, until such wear reduces the original friction surface B of said linings to the maximum adjustable wear limit C. The maximum adjustable wear limit C for the linings 6, 7 is predetermined by the movement limiting connection between the abutment surfaces 50, 50*a* on the strut flanges 51, 51*a* and the abutment surfaces 52, 52*a* on the starwheel member cylindrical portions 39, 39*a*. In other words, continued extension of the struts 45, 45*a* by adjusting rotation of the starwheel members 40, 40*a* as previously described, in response to continued lining wear slidably moves the strut flanges 51, 51*a* in the piston bores 116, 116*a* toward the adjustable members 38, 38*a* until the flange abutment surfaces 50, 50*a* are positioned in locking engagement with the abutment surfaces 52, 52*a* on said adjustable members. The distance the abutment surfaces 50, 50*a* must move into engagement with abutment surfaces 52, 52*a* defines or predetermines the maximum adjustable displacement of the brake shoes 4, 5 which is the same as the difference between the original friction surface B and the maximum adjustable wear limit C of the linings 6, 7. The locking engagement between the flange abutment surfaces 50, 50*a* and the adjustable member abutment surfaces 52, 52 further obviates adjusting rotation of the starwheel members 40, 40*a* as well as further extension of the struts 45, 45*a* to positively prevent further adjustable displacement of the brake shoes 4, 5 in excess of the predetermined amount defined by the maximum adjustable wear limit C. It should be noted that this locking engagement provides the operator with a warning that the friction linings 6, 7 are worn to a degree warranting the grommets 60 from the backing plate access openings 61 and inserts an adjusting tool, such as a screwdriver or the like (not shown), into manual driving engagement with the starwheel notches 43, 43*a* to adjustably rotate the starwheel members 40, 40*a*, the aforementioned locking engagement prevents such adjusting rotation and thereby provides the warning to the operator that the friction linings 6, 7 should be replaced.

The friction device 101 is further energizable subsequent to the locking engagement between the adjustable members 38, 38*a* and struts 45, 45*a* substantially in the same manner as previously described with the following exceptions. The pistons 110, 110*a* and 111, 111*a* are movable in response to the actuation forces between their normal retracted positions and their full or maximum travel positions in the wheel cylinder housing bores 107, 107*a* into abutting engagement with the abutment or motion limiting members 121, 121*a*. In this manner, the brake shoes 4, 5 are moved from their retracted positions at the maximum adjustable displacement thereof, as defined by the aforementioned locking engagement, to frictionally engage linings 6, 7 with the drum 10. The adjustor bodies 53, 53*a* are pivotally movable, as previously described, in response to this movement of the shoes 4, 5; however, since the adjustable members 38, 38*a* and struts 45, 45*a* are in locked engagement, the driving arms 55, 55*a* of said adjustor bodies merely jump between engagement with one of the starwheel notches 43, 43*a* and the next successive starwheel notch during such pivotal movement without adjustably driving the starwheel members 40, 40*a*. It should be noted that as the friction linings wear, as occasioned by such further frictional engagement subsequent to the aforementioned locking engagement, approaches the maximum or total permissible wear limit A, the movement of the pistons 110, 110*a* in the wheel cylinder housing bores 107, 107*a* approaches a maximum travel or movement, as limited by the abutment or stop members 121, 121*a*. It is therefore obvious that the maximum travel or movement of the pistons 110, 110*a* subsequent to the locking engagement of the adjustable members 38, 38*a* and struts 45, 45*a* defines or predetermines the permissible excess wear of the friction linings 6, 7 between the maximum adjustable wear limit C and the total permissible wear limit A. Therefore, since the maximum adjustable displacement of the shoes 4, 5 defines the maximum adjustable wear limit C, and the maximum travel of the pistons 110, 110*a* defines the permissible excess wear between said maximum adjustable wear limit C and the total permissible wear limit A, it is apparent that said maximum adjustable displacement is additive to the maximum travel to predeterminately define the total permissible wear capacity or limit (i.e., between B and A) of the friction linings 6, 7. When the linings 6, 7 are worn to their total wear limit A, further energization of the friction device 1 is obviated; however, as the wear of the linings 6, 7 approaches the wear limit C, the energization of the friction device becomes less effective and the volume of displaced pressure fluid necessary to move the pistons 110, 110*a* and 111, 111*a* toward their fully displaced position is noticably increased thereby affording the operator a warning that said linings need replacement.

Referring now to FIG. 13, another friction device 201 is shown having substantially the same component parts and functioning in substantially the same manner as the previously described friction devices 1 and 101. The friction device 201 is provided with a support or backing plate 202 which serves as a dust shield, or the like, having a plurality of centrally located apertures 203 therein for connection with a non-rotatable vehicle axle flange (not shown). A pair of opposed, radially displacable friction members or brake shoes 204, 204*a* are slidably disposed on the backing plate 202 having friction material or linings 205, 205*a* positioned thereon by a plurality of rivets 206, 206*a* for frictional engagement with a relatively rotatable friction producing member or brake drum 207, which is secured to a vehicle axle (not shown). The linings 205, 205*a* are predeterminately provided with a maximum or total permissible wear capacity or limit defined by a dotted line X spaced from the original friction surface Y of said linings and justaposed with the rivets 206, 206*a* radially outwardly thereof. The permissible wear limit X is predeterminately defined for the linings 205, 205*a* in order to prevent damaging engagement of the rivets 206, 206*a* or the brake shoes 204, 204*a* with the drum 207, and said linings are also predeterminately provided with a maximum adjustable wear limit defined by the dotted line Z spaced between the original friction surface Y and the permissible wear limit X, as will be fully discussed hereinafter. If the linings 205, 205*a* are secured to the shoes 204, 204*a* by the well-known method of bonding, then the permissible wear limit X would, of course, be juxtaposed with the brake shoe tables radially outwardly thereof.

Actuator motors or wheel cylinders 208, 208*a* are diametrally and oppositely disposed on the backing plate 202 and are operatively interconnected with adjacent ends 210, 210*a* and 211, 211*a* of the brake shoes 204, 204*a*. Diametrally and oppositely disposed anchor brackets 212, 212*a* are also secured to the backing plate between the adjacent brake shoe ends 210, 210*a* and 211, 211*a*, and said anchor brackets are also adapted for fixed connection, along with said backing plate, to the nonrotatable vehicle axle flange (not shown). Rotatable anchor pins 213, 213*a* having radially extending anchoring surfaces 214, 214*a* are pivotally mounted in the anchor brackets 212, 212*a*, and return springs 215, 215*a* are connected between the brake shoes 204, 204*a* and said anchor brackets to normally urge the brake shoe ends 210, 211 into sliding and pivotal anchoring engagement with said anchoring surfaces. The anchor brackets 212, 212*a*, FIGS. 13 and 14, are also provided with integrally cylindrical portions or housings 216, 216*a* having threaded bores 217, 217*a* therein intersected by cross slots 218, 218*a*, and adjustable anchor means or adjustment mechanisms, indicated generally at 219, 219*a* are operatively positioned in said anchor bracket housings, as will be described hereinafter. Return springs 220, 220*a* are connected between the brake shoes 204, 204*a* and the anchor brackets 212, 212*a* to normally urge the brake shoe ends 210, 211*a* into engagement with the adjustable anchor mechanisms 219, 219*a*. When the drum 207 is rotating in the forward direction, as indicated by the directional arrow in FIG. 13, the brake shoe ends 210*a*, 211 are the anchoring ends, and the brake shoe ends 210, 211*a* are the unanchored or displacable ends; however, when said drum is rotating in the reverse direction opposite to said directional arrow, the anchoring and displacement ends of said brake shoes are also reversed, i.e., brake shoes ends 210, 211*a* become the anchored ends and brake shoe ends 210*a*, 211 become the displacable ends.

Since the internal component parts of the wheel cylinders 208, 208*a* and the component parts of the adjusting mechanisms 219, 219*a* are of identical construction and configuration, only the adjusting mechanism 219 is shown in detail in FIGS. 14–16 and only the wheel cylinders 208 is shown in detail in FIG. 17; however, the corresponding component parts of the wheel cylinder 208*a* and the adjusting mechanism 219*a* are also described hereinafter. The adjusting mechanisms 219, 219*a* are provided with extendable members or struts 221, 221*a* which are threadedly received in the threaded bores 217, 217*a* of the anchor bracket housings 216, 216*a*, and keyways 222, 222*a* are longitudinally provided in the peripheral surfaces on said struts terminating in abutment or stop surfaces at 223, 223*a* adjacent the interior or rightward end of said struts. Annular adjustable members or starwheels 224, 224*a* are rotatably positioned in the cross slots 218, 218*a* of the anchor bracket housings 216, 216*a*, and said starwheels are provided with centrally located apertures or bores 225, 225*a* therein for sliding engagement on the peripheral surfaces of the struts 221, 221*a*. Keys 226, 226*a* are integrally formed on the starwheels 224, 224*a* and extend radially inwardly into sliding engagement in the strut keyways 222, 222*a* and into rotary driving engagement with the struts 221, 221*a*, and a plurality of successive grooves or notches 227, 227*a* are provided in the peripheral surfaces of said starwheels. The exterior or leftward ends of the struts 221, 221*a* define adjustable anchoring surfaces 228, 228*a* for sliding engagement with the normally displacable brake shoe ends 210, 211*a*. Diametrally opposed access openings or adjustment apertures 229, 229*a*, of which only one is shown in FIG. 16, are also provided in the backing plate 202 substantially in axial alignment with the starwheels 224, 224*a* for adjusting tool insertion purposes, and resilient closure members or grommets 230, 230*a* are removably secured in said access openings to prevent the entry of foreign particles into the friction device 201.

One of the features of the present invention is concerned with limiting the adjustable travel or displacement of the brake shoes 204, 204*a* relative to the drum 207 in excess of a predetermined amount, i.e., in excess of the adjustable wear limit Z, to prevent damaging engagement of the rivets 206, 206*a* or said brake shoes upon frictional engagement when the friction surfaces of the linings 205, 205*a* are sufficiently worn to a degree warranting replacement. For this purpose, lost motion or movement limiting connections are provided between the starwheels 224, 224*a* and the struts 221, 221*a*. These movement limiting connections are defined by the keyway abutment surfaces 223, 223*a* in the struts 221, 221*a* and the keys 226, 226*a* on the starwheels 224, 224*a*.

The wheel cylinders 208, 208*a*, FIG. 17, are provided with housings 231, 231*a* having integral mounting hubs 232, 232*a* protruding through diametrally opposed openings 233, 233*a*, of which only one is shown in FIG. 17, in the backing plate 202, and said housings are fixedly positioned on said backing plate by suitable means, such as studs 234, 234*a*. The wheel cylinder housings 231, 231*a* are provided with bores 235, 235*a* intersected by passages 236, 236*a* near the mid-portion thereof, and said passages extend through the mounting hubs 232, 232*a* to connect with inlet or service ports 237, 237*a*. Opposed pistons 238, 238*a* and 239, 239*a* are slidably received in the housing bores 235, 235*a* on opposite sides of the passages 236, 236*a*, and opposed resilient sealing cups 240, 240*a* and 241, 241*a* are sealably interposed between the interior ends of said pistons and said housing bores. Springs 242, 242*a* are biased between the cups 240, 240*a* and 241, 241*a* to normally urge said cups into engagement with the interior ends of the pistons 238, 238*a* and 239, 239*a*. The pistons 238, 238*a* and 239, 239*a* are provided with recesses 243, 243*a* and 244, 244*a* in the exterior ends thereof, and force transmitting links 245, 245*a* and 246, 246*a* have one end pivotally received in said recesses while the other ends thereof connect with the brake shoes 204, 204*a*. The housing bores 235, 235*a* are also provided with annular grooves 247, 247*a* and 248, 248*a* adjacent to the opposed ends thereof in which abutment members or snap rings 249, 249*a* and 250, 250*a* are respectively positioned, said abutment members being spaced a predetermined distance from the exterior end of pistons 243, 243*a* and 244, 244*a* to define the maximum stroke or motion limiting movements thereof. Resilient boots 251, 251*a* and 252, 252*a* are interposed between the opposed ends of the wheel cylinder housings 231, 231*a* and the links 245, 245*a* and 246, 246*a*, respectively, to prevent the entry of foreign particles into said wheel cylinder housings.

To complete the description of the friction device 201, resilient ratchet arms 253, 253*a* are positioned on the anchor bracket housings 216, 216*a* by suitable means, such as studs 254, 254*a*, having one end engaged with the notches 227, 227*a* of the starwheels 224, 224*a* to prevent undesirable adjusting rotation thereof and depending tabs 255, 255*a* on the other end thereof engaged with said anchor bracket housings to obviate rotation of said ratchet arms about said studs.

In the operation of the friction device 201 with the component parts thereof positioned as described, fluid pressure transmitted to the wheel cylinder housing bores 235, 235*a* through the port and passages 237, 237*a* and 236, 236*a* acts on the effective areas of the sealing cups 241, 241*a* and 242, 242*a* creating actuating forces effective to move the pistons 238, 238*a* and 239, 239*a* from their retracted positions in said housing bores in an outward or friction device energizing direction. In this manner, the displaceable brake shoe ends 210, 211*a* are radially displaced from their retracted positions on the anchoring surfaces 228, 228*a* against the compressive forces of the return springs 220, 220*a* to frictionally engage the linings 205, 205*a* with the rotating drum 207 to energize the friction device 201 in the forward direction, as indicated by the directional arrow in FIG. 13. To de-energize the friction device 201, the established fluid pressure in the wheel cylinder housing bores 235, 235*a* is exhausted thereby eliminating the actuating forces, and the compressive forces of the return springs 220, 220*a* move the brake shoes 204, 204*a* from frictional engagement with the drum 207 toward their retracted positions which, in turn, moves the links 245, 245*a* and 246, 246*a* and the wheel cylinder pistons 238, 238*a* and 239, 239*a* toward their retracted positions.

Assuming that the friction linings 205, 205*a* become sufficiently worn from frictional engagement to warrant adjustment of the friction device 201, the operator removes the grommets 230, 230*a* from the access openings 229, 229*a* in the backing plate 202 and inserts an adjusting tool, such as a screwdriver or the like (not shown), therethrough into driving or ratcheting engagement with the starwheel notches 227, 227*a* to adjustably drive or rotate the starwheels 224, 224*a* against the positioning force of the ratchet arms 253, 253*a*. The sliding and driving engagement of the starwheel keys 226, 226*a* in the strut keyways 222, 222*a* effects concert rotation of the struts 221, 221*a* with the starwheels 224, 224*a* to effect further threaded engagement between said struts and the anchor bracket housing threaded bores 217, 217*a* to thereby extend the strut anchoring surfaces 228, 228*a* outwardly and adjust the retracted positions of the brake shoes 204, 204*a*. In this manner, the extension of the struts 221, 221*a* adjustably displaces the brake shoes 204, 204*a* to advance the position of the linings 205, 205*a* toward the drum 207 and compensate for lining wear occasioned upon frictional engagement or, in other words, adjustably reposition the retracted positions of said brake shoes, and thereby adjusts the friction device 201.

Continued wear of the friction linings 205, 205*a* will, of course, occasion further adjusting displacement of the brake shoes 204, 204*a*, in the same manner as previously described, until such wear reduces the original friction surface Y of said linings to the maximum adjustable wear limit Z. The maximum adjustable wear limit Z for the linings 205, 205*a* is predetermined by the movement limiting connection between the starwheel keys 226, 226*a* and the keyway end or abutment surfaces 223, 223*a*. In other words, continued extension of the struts 221, 221*a* by adjusting rotation of the starwheels 224, 224*a* moves the keyway abutment surfaces 223, 223*a* toward the starwheel keys 226, 226*a* until said keyway abutment surfaces are positioned in locking engagement with said starwheel keys. The distance the keyway abutment surfaces 223, 223*a* must move into locking engagement with the starwheel keys 226, 226*a* defines or predetermines the maximum adjustable displacement of the brake shoes 204, 204*a* which is the same as the difference between the original friction surface Y and the adjustable wear limit Z of the linings 205, 205*a*. It should be noted that the locking engagement prevents further manual adjusting rotation of the starwheels 224, 224*a* and thereby provides a warning to the operator that the linings 205, 205*a* should be replaced.

The friction device 201 is further energizable subsequent to the locking engagement between the starwheels 224, 224*a* and struts 221, 221*a* in the same manner as previously described with the following exceptions. Of course, as the brake shoes 204, 204*a* are adjustably displaced to their positions of maximum adjustable displacement, the wheel cylinder springs 242, 242*a* urges the sealing cups 240, 240*a* and 241, 241*a* in follow-up relation therewith; therefore, said cups and pistons are now movable in response to the actuating forces thereon toward abutting engagement with the stops 249, 249a and 250, 250a. In this manner, the brake shoes 204, 204a are moved from their retracted positions at the maximum adjustable displacement thereof, as defined by the aforementioned locking engagement, to further frictionally engage the linings 205, 205a with the drum 207. It should be noted that as the linings 205, 205a wear, as occasioned by the further friction engagement subsequent to the aforementioned locking engagement, approaches the maximum or total permissible wear limit X, the movement of the pistons 238, 238a and 239, 239a in the wheel cylinder housing bores 235, 235a approaches a maximum travel or movement, as limited by the stop members 249, 249a and 250, 250a. It is therefore obvious that the maximum travel or movement of the pistons 238, 238a and 239, 239a subsequent to the locking engagement of the struts 221, 221a and the starwheels 224, 224a defines or predetermines the permissible excess wear of the linings 205, 205a between the adjustable wear limit Z and the total permissible wear limit X. Therefore, since the maximum adjustable displacement of the shoes 204, 204a defines the maximum adjustable wear limit Z, and the maximum travel of the pistons 238, 238a and 239, 239a subsequent to the aforementioned locking engagement defines the permissible excess wear between Z and X, it is apparent that the maximum adjustable displacement is additive to the maximum travel to predeterminately define the total permissible wear capacity or limit (i.e., between X and Y) of the linings 205, 205a. When the linings 205, 205a are worn to their total wear limit X, further energization of the friction device 201 is obviated since the pistons 238, 238a and 239, 239a would be displaced into engagement with the stops 249, 249a and 250, 250a; however, as the wear of the linings 205, 205a approaches total wear limit X, the energization of said friction device becomes less effective and the volume of displaced pressure fluid necessary to move said pistons to their fully displaced positions in engagement with said stops is noticably increased thereby affording the operator a warning that said linings need replacement.

From the foregoing, it is now apparent that novel friction devices 1, 101, 201 and sub-assemblies or component parts thereof meeting the objects set out hereinbefore are provided and that changes or modifications as to the precise combinations, configurations, shapes and details of the constructions set forth in the disclosure by way of illustration may be made by those skilled in the art without departing from the spirit of the inventions as defined by the claims which follow.

The embodiments of the invention in which an exclusive property or privilege is claimed are defined as follows:

1. A cage and roller assembly for a wedge actuated type friction device comprising a body member having a substantially U-shaped configuration including a pair of transversely extending arm portions integrally interconnected by a convolute resilient portion, spaced flange means on each of said arm portions, means in each of said arm portions defining slot means therethrough between said flange means, mounting apertures in each of said flange means, and roller means rotatably mounted in said mounting apertures about a fixed axis and extending through said slot means beyond said arm portions, respectively.

2. A cage and roller assembly for a wedge actuated type friction device comprising a body member having a substantially U-shaped configuration including a pair of opposed arm portions interconnected by a resilient portion, spaced flange means on each of said arm portions and substantially normal thereto, marginal edges on said flange means defining the extremity of said flange means from said arm portions, slot means in each of said arm portions between said flange means, mounting apertures in each of said flange means and aligned with said slot means, and rollers rotatably mounted in said mounting apertures and having a peripheral bearing surface extending beyond said marginal edges and through said slot means beyond said arm portions.

3. A cage and roller assembly for a wedge actuated type friction device comprising a body member having a substantially U-shaped configuration including a pair of transversely extending arm portions, a base portion on each of said arm portions defined by opposed ends and sides, resilient means respectively interconnected with an end of each base portions, flange means connected with each of said base portions at the sides thereof and being substantially normal to said base portions, slot means in each of said base portions between the sides thereof and having opposed edges substantially normal to the sides of said base portions, mounting apertures in each of said flange means and aligned between the opposed edges of said slot means, a roller in each of said base portions between the opposed edges of said slot means and the sides of said base portions, and trunnion means on each of said rollers rotatably mounted in said mounting apertures, said rollers having peripheral bearing surfaces extending beyond said base portions and beyond said flanges.

4. A subassembly for a wedge actuated type friction device comprising an axially displaceable wedge having opposed inclined sides and releasably connected with a fluid pressure responsive actuating motor, a cage and roller assembly loosely mounted on said wedge for floating engagement therewith including a body portion of relatively thin strip material having a pair of arm portions respectively extending in planes adjacent to the opposed inclined sides of said wedge, slot means in each of said arm portions and extending therethrough in planes substantially normal to the opposed inclined sides of said wedge, rollers mounted about a fixed axis on said arm portions and extending through said slots beyond said arm portions into bearng driven engagement with the opposed inclined sides of said wedge, and a resilient portion integral with said arm portions and having a U-shaped convolution adjacent one end of said wedge, said resilient portion being yieldable to provide concert displacement of said arms and rollers in a direction substantially normal to the axis of said wedge upon the axial displaceable thereof, and means on said wedge for lost motion engagement with said cage and roller assembly to provide only limited displacement of said wedge along the axis thereof in one direction.

5. A subassembly for a wedge actuated type friction device comprising an axially displaceable wedge connected at one end thereof with a fluid pressure responsive actuating motor, a cage and roller assembly mounted on said wedge including a pair of arm portions substantially parallel with the opposing inclined sides of said wedge, spaced flange means on each of said arms and substantially normal thereto, rollers mounted between said flange means for rolling engagement with the inclined sides of said wedge, a resilient portion interconnected between said arm portions adjacent to the other end of said wedge to provide concert displacement of said arms and rollers in a direction substantially normal to the axis of said wedge in response to displacement of said wedge along the axis thereof in one direction, and a stop connected with the other end of said wedge and extending outwardly therefrom for engagement with said rollers, said stop being movable into engagement with said rollers to limit displacement of said wedge along the axis thereof in the other direction.

6. A subassembly for a wedge actuated type friction device comprising a wedge connected at one end thereof with a fluid pressure responsive actuating motor, a cage and roller assembly mounted on said wedge including a pair of arm portions spaced from the inclined sides of said wedge, rollers mounted on each of said arm portions for rolling engagement with the inclined sides of said wedge, a resilient portion having a substantially U-shaped configuration connected between said arm portions and spaced from the other end of said wedge, said resilient portion being stressed to provide concert displacement of said arms and rollers in an operative direction substantially normal to the axis of said wedge, means on said cage and roller assembly for engagement with an adjacent portion of said friction device to limit displacement of said cage and roller assembly along the axis of said wedge in one direction, and other means on said wedge for engaegment with said cage and roller assembly to limit displacement of said wedge along the axis thereof in the one direction.

7. In a brake assembly adapted for coaction with a surrounding relatively rotatable drum, support means, at least two friction members mounted on said support means for outward displacement into frictional engagement with said drum, actuator means on said support means disposed between said friction members including opposed plungers movable therein and having their outer ends operatively connected with said friction members, a wedge member reciprocally movable substantially along its own axis between the adjacent inner ends of said plungers and having opposed inclined surfaces respectively adjacent to the inner ends of said plungers, and a unitary cage assembly movably mounted in said actuator means independently of said wedge member and plungers for translating axial movement of said wedge member in one direction into displacement movement of said plungers to effect the frictional engagement of said friction members with said drum including opposed arm portions extending substantially in planes intermediate said opposed wedge member surfaces and the inner ends of said plungers, respectively, roller means rotatably mounted about a fixed axis on said arm portions and in bearing engagement between said opposed wedge member surfaces and the inner ends of said plungers, and a resilient portion interconnecting said arm portions, said resilient portion being yieldable to provide displacement movement of said arm portions and roller means in a plane substantially normal to the axis of said wedge member to displace said plungers and move said friction members into frictional engagement with said drum upon the axial movement of said wedge member in the one direction, a fluid pressure responsive motor releasably engaged with said support means and said wedge member for driving said wedge member in the one direction, and abutment means on said cage assembly for engagement with at least one of said plungers to prevent displacement of said cage assembly from said actuator means when said motor is disengaged from said support means and said wedge member.

8. In the brake assembly according to claim 7, comprising other abutment means on said wedge member for engagement with said cage assembly to prevent displacement of said wedge member from said actuator means upon the disengagement of said motor.

References Cited

UNITED STATES PATENTS

| | | | |
|---|---|---|---|
| 1,968,667 | 7/1934 | White | 188—152 |
| 2,303,699 | 12/1942 | Main | 188—79.5 X |
| 2,340,464 | 2/1944 | Gates | 188—79.5 X |
| 2,527,126 | 10/1950 | Goepfrich et al. | 188—78 |
| 2,822,065 | 2/1958 | Goepfrich et al. | 188—78 |
| 2,748,901 | 6/1956 | Brooks | 188—196 |
| 3,017,962 | 1/1962 | Ingres | 188—79.5 |
| 3,037,584 | 6/1962 | Cox et al. | 188—78 |
| 3,169,610 | 2/1965 | Gold | 188—79.5 |

MILTON KAUFMAN, *Primary Examiner.*

DUANE A. REGER, FRED C. MATTERN, *Examiners.*

F. E. BAKER, *Assistant Examiner.*